July 11, 1961  G. D. HOYLE, JR., ET AL  2,991,477
JOINT NAIL PACKAGE

Filed July 31, 1958

INVENTORS
GETTYS D. HOYLE, JR. &
RICHARD FERGUSON
BY
Parrott & Richards
ATTORNEYS

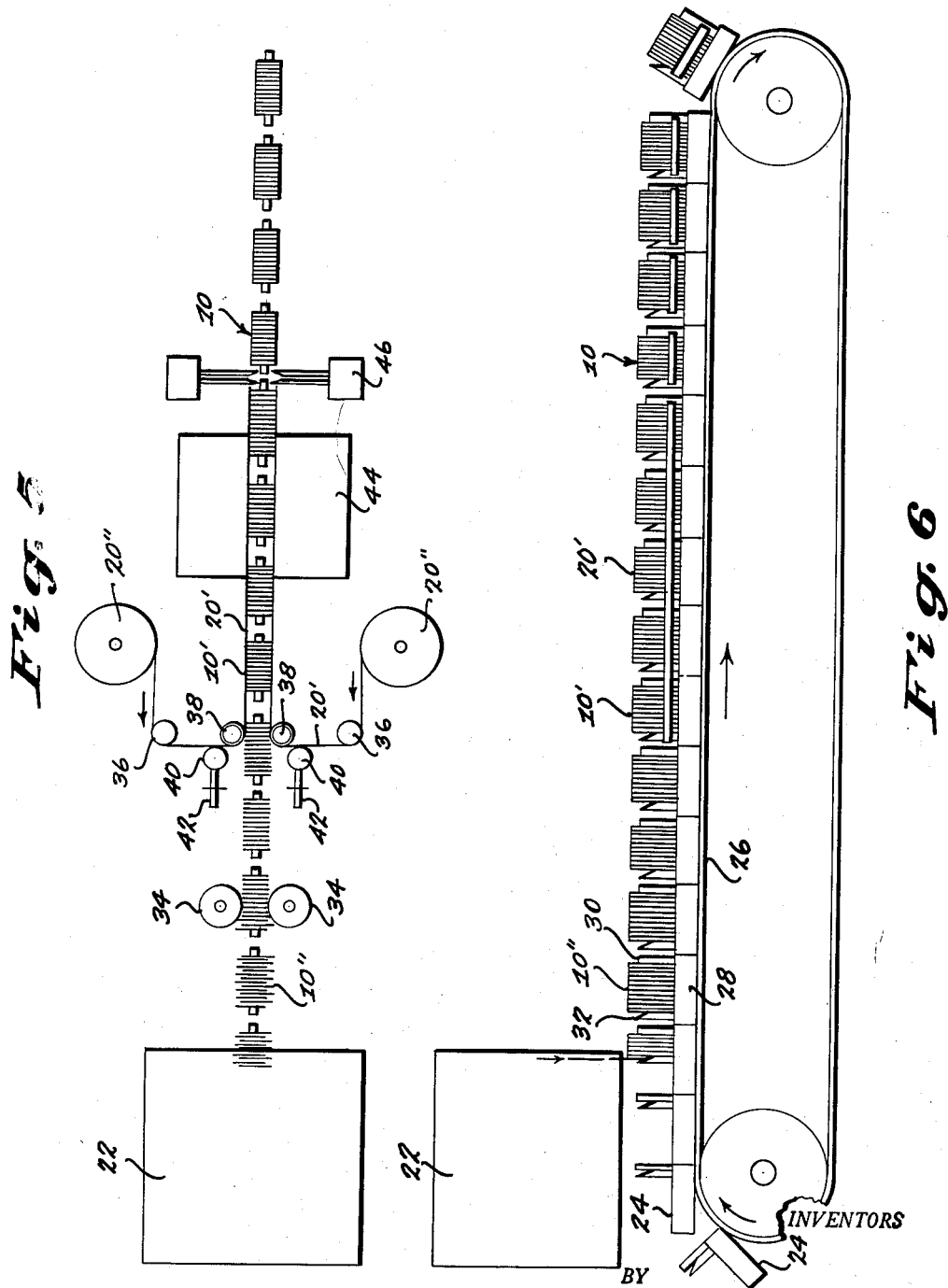

2,991,477
JOINT NAIL PACKAGE

Gettys D. Hoyle, Jr., and Richard Ferguson, Charlotte, N.C., assignors to The Terrell Machine Company, a corporation of North Carolina
Filed July 31, 1958, Ser. No. 752,285
2 Claims. (Cl. 1—56)

This invention relates generally to joint nails of the type having a web portion formed with opposite side edge clamping flanges so as to be adapted for driving at a transverse kerf formed across a corner joint or the like in furniture goods and other comparably jointed structures for securing the joints therein, as disclosed, for example, in U.S. Patent No. 1,793,185, issued February 17, 1931.

More particularly, a package of such joint nails is provided according to the present invention suitable for insertion as such in a supply magazine of a joint nailing mechanism and arranged for effective separate stripping of the packaged joint nails from the magazine by the nailing mechanism. For this purpose, the joint nail package of the present invention is characterized by a sidewise series of joint nails assembled with frangible means binding the joint nail series at the flanges thereof, the binding means being applied to the flanges so as to have a tenacity thereat exceeding its shearing strength between the flanges and thereby allow the above mentioned separate stripping of the joint nails while providing an effective packaging thereof for convenient and efficient handling of the joint nail supply. In order to obtain as compact and stable a package as possible, the flanges of the assembled series of joint nails are preferably internested, suitably in alternately staggered relation as pointed out further below, although the nesting might also be done by staggering the flanges successively in the same direction if the nailing mechanism to be used were adapted for handling the resulting angularly shaped package, or the joint nails may be formed individually with angled or slanted flanges so as to be internestable without staggering.

The present invention further relates to an advantageous method of forming joint nail packages such as are described above, and to means for carrying out this method, all of which, together with the foregoing and other features of the resulting joint nail package, are described in detail below in connection with the accompanying drawings, in which:

FIG. 5 is a diagrammatic plan view of means for forming a joint nail package, such as is shown in FIGS. 1 to 4, according to the present invention; and FIG. 6 is a side view corresponding to FIG. 5.

Figure 1:
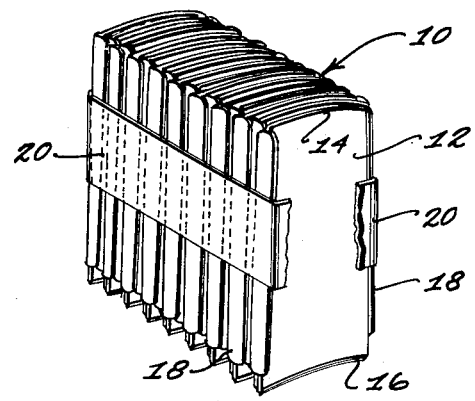
FIG. 1 is a perspective view of a representative joint nail package arranged in accordance with the present invention.
Figure 2:
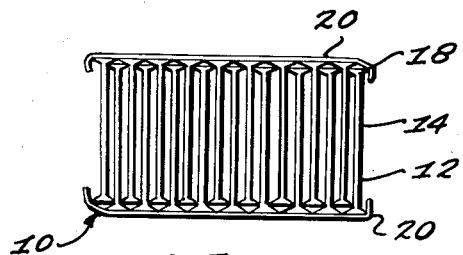
FIG. 2 is a top plan view of the joint nail package shown in FIG. 1.
Figure 3:
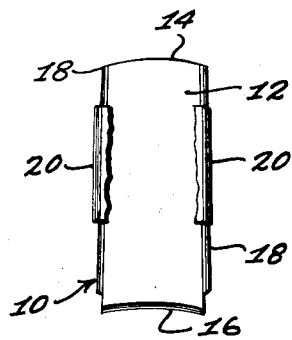
FIG. 3 is a right end view corresponding to FIG. 2.
Figure 4:
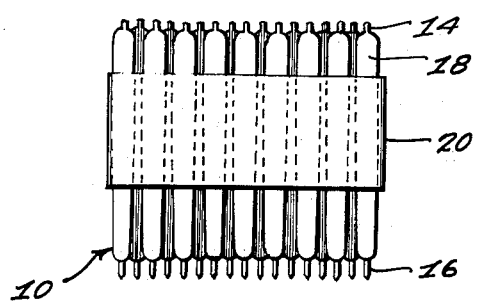
FIG. 4 is a side elevation corresponding to FIG. 2.

Referring now in detail to the drawings, FIGS. 1 to 4 illustrate the form of joint nail package provided according to the present invention, as indicated generally by the reference numeral 10. The joint nails contained in this package 10 are of conventional form (such as is disclosed in the above identified prior patent disclosure), having a web portion 12 arranged with a driving rear end edge at 14 and a leading driven edge at 16 and with opposite side edge clamping flanges 18; the clamping flanges 18 flaring in the usual manner toward the leading driven edge 16 so as to provide a joint clamping action as the nails are driven transversely of a corner joint or the like to be secured.

As arranged in the illustrated package 10 the joint nails form a sidewise series in which the web portions 12 thereof are spaced in substantially parallel relation and the clamping flanges 18 are staggered in alternately internested relation as previously mentioned. By this arrangement a stable assembly of the joint nail series is obtained that may be bound effectively in package form by suitably frangible means such as adhesively secured paper strips 20 applied lengthwise at each side of the package 10 across the internested flanges 18. Preferably, the paper strips 20 are formed of a fairly thin, untreated, paper that is sufficiently porous to take up a securing adhesive readily while supporting an adequate adhesive film thereon for bonding the strips 20 strongly to the joint nail flanges 18 and thereby causing the strips 20 to rupture between the flanges 18, rather than pulling away thereat, upon stripping of a joint nail from the package 10.

This relative arrangement of the paper strips 20 in the package 10 results in maintaining the ruptured segments of the paper strips 20 attached on the clamping flanges 18 as each joint nail is stripped from the package 10 for joint nailing insertion so the ruptured strip segments are successively carried on the joint nail flanges into the joints being secured and thereby disposed of without any fouling accumulation thereof in or about the joint nailing mechanism. At the same time a very substantial operating advantage is afforded by having the joint nails supplied initially in packages 10 so that they may be inserted readily in the supply magazine for a joint nailing mechanism, such as is disclosed and claimed in copending application Serial No. 756,803, filed August 25, 1958, without requiring any particular attention to the individual arrangement of the joint nails or any burdensome handling thereof.

The adhesive employed for securing the paper strips 20 is preferably a tacky, heat settable, adhesive composition by which the paper strips 20 may be initially held in place when applied for subsequent heat curing to establish the bonding strength necessary at the joint nail flanges 18 to insure rupture of the paper strips 20 therebetween upon stripping of the joint nails. The adhesive composition used should also be characterized by a relatively low curing temperature so as to avoid a curing heat high enough to burn off of the joint nails being packaged the oil coating normally carried thereon and in the absence of which objectionable rusting of the joint nails is apt to occur during storage after packaging. In view of this circumstance, the curing temperature should not be more than about 300° to 350° F. in any event, and should preferably be of the order of 125° to 150° F. Synthetic latex adhesive compositions having a curing temperature of the above indicated order serve very satisfactorily for securing the paper strips 20.

Alternatively, the adhesively secured paper strips 20 may be replaced by other binding means providing a comparable frangible binding action. For example, heat sealable tape strips may be employed effectively, although provision should be made to effect the heat sealing rapidly with a sufficient initial intensity to avoid undue dissipation of heat through the body of the joint nails being packaged, which not only heats the nails objectionably but complicates unduly the heat sealing operation. It is also possible to use tape strips having a pressure sensitive adhesive coating thereon, so long as the adhesive coating is amenable to drying by heat so as to eliminate any residual tackiness in the completed package. In addition, lacquer coatings or the like may be used as the binding means without requiring any paper strips 20, such coatings being applied either by rolling or spraying or otherwise depositing a stripe thereof along the sides of the packages at the joint nail flanges in an extent comparable to that of the paper strips 20, or by dipping the assembled joint nail series in the lacquer coating, and then heating or drying with an air blast or the like to set or cure the coating as required.

Apparatus for forming joint nail packages 10 of the type described above and the manner in which this apparatus is operated to form the packages 10 are illustrated diagrammatically in FIGS. 5 and 6. As illustrated, the apparatus comprises means as indicated at 22 for feeding one joint nail at a time from a bulk supply. This feeding means 22 may be arranged to handle a coiled continuous strip of joint nails so as to separate successively the leading nail from the strip and feed it individually, or it may consist of a vibratory sorting hopper or the like operating to orient and feed the joint nails individually or in a package unit group from a loose supply maintained therein. In addition, the feeding means 22 is preferably arranged according to the present invention so as to dispose the joint nails fed therefrom in alternate laterally displaced or staggered relation as indicated in FIG. 5.

The joint nails are received from the feeding means 22 by carrier units 24 arranged on a continuously indexing conveyor 26. The carrier units 24 comprise a base frame portion 28, which is attached to the conveyor 26, and fixed and movable end support arms 30 and 32 extending uprightly from the base frame portion 28. The movable support arm 32 is arranged for rearward displacement against a bias thereon as the joint nails are fed from the feeding means 22 to a carrier unit 24 indexed thereunder. The rearward displacement of the movable support arm 32 provides for receiving the joint nails as they are fed at a standing disposition between the respective fixed and movable support arms 30 and 32, so as to accumulate a sidewise joint nail series 10" therebetween if the joint nails are fed individually, or to receive and hold such a series 10" if the feeding is done in package unit groups. An advantageous package size is about 2½" in length and contains about 32 joint nails.

As arranged in the carrier units 24 in the manner described above, the package unit joint nail series 10" has the clamping flanges 18 of the successive joint nails therein staggered in alternately internested relation by reason of the action of the feeding means 22 in this respect as noted above. Also, it should be noted that the upright support arms 30 and 32, being themselves arranged in parallel relation, act to contain the joint nail series 10" with the web portions 12 of the joint nails therein substantially parallel despite any irregularity or non-parallel shaping of the clamping flanges 18. As a result, a stable joint nail series 10" is obtained for packaging through the internesting of the clamping flanges 18, and the parallel joint nail disposition maintained in the assembled series 10" provides for subsequent mechanical stripping thereof to the best advantage from the completed package 10.

Following disposition of a joint nail series 10" in each carrier unit 24, the indexing conveyor 26 acts to advance the carrier units 24 in spaced succession with the joint nails standing uprightly and the internested flanges 18 thereof exposed sidewise for compact alignment between a pair of rolls at 34, and then for application of a continuous length of adhesive coated paper tape 20' thereto; the tape 20' being drawn from a roll supply thereof at 20" over guide rolls 36 and 38 between which an adhesive coating is applied thereto by transfer rolls 40 and 42, and from which the adhesive coated tape 20' directed across the internested joint nail flanges 18 lengthwise of each series 10" and still in a continuous length along the spaced succession thereof so as to form a tape connected successive joint nail series 10' that are then advanced through suitable heating mean at 44 for curing the adhesive coating on the tape 20'.

After passage through the heating means 44, the carrier units 24 are then advanced past a tape severing device at 46 operating to cut the connections between the sucessive joint nail series 10' and thereby form a separate joint nail package 10 in each carrier unit 24 for removal from the apparatus at some convenient point during the travel of the carrier units 24 along the return reach of the conveyor 26.

The present invention has been described in detail above for purposes of illustration only and is not intended to be limited by this description or otherwise except as defined in the appended claims.

We claim:

1. A package of flanged joint nails of the type having a web portion formed with opposite side edge clamping flanges, said package comprising a sidewise series of said joint nails assembled in abutting relation with the flanges thereof staggered in alternately internested relation and with frangible binding strips extending lengthwise at each side of said joint nail series across said alternately internested flanges, and thereby engaging every other flange at the respective sides of said series and binding said joint nails alternately at said respective sides.

2. A package of flanged joint nails of the type having a web portion formed with opposite side edge clamping flanges, said package comprising a sidewise series of said joint nails assembled in abutting relation with the flanges thereof staggered in alternately internested relation and with paper strips secured across said alternately internested flanges lengthwise at each side of said assembled series of joint nails by securing means bonding said paper strips only to every other of said alternately internested flanges and binding said joint nails alternately at said respective sides.

References Cited in the file of this patent

UNITED STATES PATENTS

| Number | Name | Date |
| --- | --- | --- |
| 1,026,050 | Reber | May 14, 1912 |
| 1,046,665 | Smith | Dec. 10, 1912 |
| 1,258,732 | Zimmerman | Mar. 12, 1918 |
| 1,342,712 | Garllus et al. | June 8, 1920 |
| 1,665,051 | Briggs | Apr. 3, 1928 |
| 1,883,113 | Titchener | Oct. 18, 1932 |
| 1,942,249 | Kleinschmit | Jan. 2, 1934 |
| 2,232,994 | Bernstein | Feb. 25, 1941 |
| 2,740,964 | Derby | Apr. 10, 1956 |
| 2,743,445 | Lerner | May 1, 1956 |